US012347164B2

United States Patent
Huang et al.

(10) Patent No.: US 12,347,164 B2
(45) Date of Patent: Jul. 1, 2025

(54) IMAGE PROCESSING METHOD AND SYSTEM FOR UPDATING TEMPLATE LIBRARY BASED ON LIFE VALUE OF FACIAL TEMPLATE IMAGES

(71) Applicant: SHENZHEN YINWANG INTELLIGENT TECHNOLOGIES CO., LTD., Shenzhen (CN)

(72) Inventors: Xiaolin Huang, Shenzhen (CN); Wei Huang, Munich (DE); Wenkang Xu, Shenzhen (CN); Junhao Zhang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 405 days.

(21) Appl. No.: 17/950,698

(22) Filed: Sep. 22, 2022

(65) Prior Publication Data

US 2023/0009695 A1 Jan. 12, 2023

Related U.S. Application Data

(63) Continuation of application No. PCT/CN2021/074420, filed on Jan. 29, 2021.

(30) Foreign Application Priority Data

Mar. 24, 2020 (CN) .......................... 202010213960.1

(51) Int. Cl.
*G06V 10/75* (2022.01)
*G06V 40/16* (2022.01)

(52) U.S. Cl.
CPC .......... *G06V 10/751* (2022.01); *G06V 40/161* (2022.01)

(58) Field of Classification Search
CPC ..... G06V 40/50; G06V 40/16; G06V 40/1365
See application file for complete search history.

(56) References Cited

U.S. PATENT DOCUMENTS

| 8,331,632 B1 * | 12/2012 | Mohanty | ............. | G06F 18/2137 |
| | | | | 382/160 |
| 8,396,265 B1 * | 3/2013 | Ross | .................... | G06V 40/172 |
| | | | | 382/103 |
| 8,515,139 B1 | 8/2013 | Nechyba et al. | | |

(Continued)

FOREIGN PATENT DOCUMENTS

| CN | 101770613 A | 7/2010 |
| CN | 103400106 A | 11/2013 |

(Continued)

OTHER PUBLICATIONS

Extended European Search Report in European Appln No. 21775965.3, dated Jun. 20, 2023, 6 pages.

(Continued)

*Primary Examiner* — Guillermo M Rivera-Martinez
(74) *Attorney, Agent, or Firm* — Fish & Richardson P.C.

(57) ABSTRACT

This application discloses image processing methods and systems. One method includes: obtaining a first image, obtaining a template image having a life value that determines whether the template image is valid, comparing the first image with the template image, and storing the first image in a template library as a new template image in response to determining that the first image matches the template image.

20 Claims, 8 Drawing Sheets

(56) References Cited

U.S. PATENT DOCUMENTS

| | | | |
|---|---|---|---|
| 8,559,684 B1* | 10/2013 | Nechyba | G06V 10/761 |
| | | | 382/118 |
| 2010/0275258 A1* | 10/2010 | Kamakura | G06F 21/32 |
| | | | 726/19 |
| 2011/0243381 A1* | 10/2011 | Tsagkatakis | G06V 30/194 |
| | | | 382/103 |
| 2012/0326841 A1* | 12/2012 | Aoki | G06F 21/32 |
| | | | 340/5.82 |
| 2013/0247175 A1* | 9/2013 | Nechyba | G06F 21/32 |
| | | | 726/19 |
| 2014/0010415 A1* | 1/2014 | Kunieda | G06V 40/172 |
| | | | 382/118 |
| 2017/0140212 A1* | 5/2017 | Lo | G06V 40/171 |
| 2019/0042835 A1* | 2/2019 | Mostafa | G06F 21/32 |
| 2020/0042685 A1* | 2/2020 | Tussy | G06V 40/50 |
| 2020/0053077 A1* | 2/2020 | Merrell | G06Q 20/40145 |
| 2020/0082062 A1* | 3/2020 | Mequanint | G06F 21/44 |
| 2020/0257893 A1* | 8/2020 | Trani | G06V 40/172 |

FOREIGN PATENT DOCUMENTS

| | | |
|---|---|---|
| CN | 104537336 A | 4/2015 |
| CN | 107016412 A | 8/2017 |
| CN | 108399325 A | 8/2018 |
| CN | 109325327 A | 2/2019 |
| CN | 110555364 A | 12/2019 |
| WO | 2020050966 A1 | 3/2020 |

OTHER PUBLICATIONS

Bonawitz et al., "Towards Federated Learning at Scale: System Design," Submitted on Mar. 22, 2019 arXiv:1902.01046v2 [cs.LG], 15 pages.

International Search Report and Written Opinion in International Appln. No. PCT/CN2021/074420, mailed on May 7, 2021, 17 pages (with English translation).

* cited by examiner

IMAGE PROCESSING METHOD AND SYSTEM FOR UPDATING TEMPLATE LIBRARY BASED ON LIFE VALUE OF FACIAL TEMPLATE IMAGES

CROSS-REFERENCE TO RELATED APPLICATIONS

This application is a continuation of International Patent Application No. PCT/CN2021/074420 filed on Jan. 29, 2021, which claims priority to Chinese Patent Application No. 202010213960.1 filed on Mar. 24, 2020. The disclosures of the aforementioned applications are hereby incorporated by reference in their entireties.

TECHNICAL FIELD

This application relates to an image processing technology, and furthermore, to an image recognition technology.

BACKGROUND

With the development of informatization and intelligentization, a user identity identification function is configured for an increasing quantity of devices (such as a mobile phone, an IoT (Internet of things) device, and an automobile). Because of having contactless and natural features, facial recognition is widely applied to fields such as mobile phones, the IoT, and automobiles. Currently, facial recognition is usually comparing a face image frame that is of a user and that is obtained by using a camera during use and a face template (a face image template that is of the user and that is obtained during initial registration) stored in a system, and determining whether the face image frame matches the face template. However, in this solution, if a user has a relatively large use year span or wears an accessory (for example, a hat, a mask, a scarf, or glasses), recognition may be often rejected.

In the automobile field, the foregoing problem is more obvious. First, an automobile has a long service life (usually several years or even more than 10 years). During this time-period, the appearance of a user may change obviously, furthermore, space in the automobile is limited, because of a space limitation and a sitting pose habit of the user, in many cases, it is difficult for the user to directly face a camera when he conducting identification, and therefore it is often difficult for an obtained face image to be in a "front face" state. Finally, a considerable quantity of users may wear accessories (for example, masks, hats, or scarfs) on heads or necks. This case is especially common in winter or in a poor weather condition. In the foregoing cases, if a user wore an accessory or did not directly face a camera, recognition needs to be performed after the user removes the accessory, for example, a mask, a hat, or glasses, or after the user "sits upright" to directly face the camera. This causes a feeling of long recognition time and poor recognition experience. In addition, if a relatively large age span of a user causes a relatively large change in an appearance, recognition may also be often rejected.

For the foregoing problem, some solutions are proposed in the conventional technology. For example, an auxiliary image is provided, or training data or a model is updated. However, in these methods, hardware dependence is still great, and consequently user identification in a case of a large time span cannot be better resolved, and user identification cannot be performed if a user wears an accessory or a face fails to directly face a camera (be in a "front face" state).

Based on the foregoing, a new recognition method is required, to overcome the foregoing problem.

SUMMARY

According to an aspect of this application, an embodiment of this application provides an image processing method. The method may include: obtaining a first image and a template image, where the template image has a life value, and the life value is used to determine whether the template image is valid; and determining, through comparing, whether the first image matches the template image, and if the matching succeeds, storing the first image in a template library as a template image. According to the method provided in this embodiment of this application, the life value is assigned to the template image, and a newly obtained suitable image is used as a template image, so that the template library can be updated in time, thereby better completing a user identification process.

With reference to a possible implementation of the first aspect, the method further includes: obtaining a life value of a template image in the template library; and determining whether the life value of the template image is less than a specified threshold, and if the life value of the template image is less than or equal to the specified threshold, deleting the template image from the template library. For example, the template library may be updated each time image matching is performed, and a template image whose life value is less than or equal to a specified threshold is deleted from the template library, so that the template image is kept iteratively updated, thereby improving image recognition accuracy in a long time span. For another example, the template library may be periodically updated to delete, from the template library, a template image whose life value is less than or equal to a specified threshold. For another example, the template library may be updated based on an event trigger (for example, a user-specified instruction), to delete, from the template library, a template image whose life value is less than or equal to a specified threshold.

With reference to a possible implementation of the first aspect, both the template image and the first image may be face images, that is, the technical solution of the first aspect is applied to the facial recognition field, to improve facial recognition accuracy in a long time span.

With reference to a possible implementation of the first aspect, the template image is classified under two types: a first template image and a second template image. The first template image includes a face-dominant image, and the second template image includes a special face image. The face-dominant image includes an unblocked face image in a limited angle range. The special face image may be an image that includes a partial face feature. The special face image includes at least one of the following: a face image with a blocked face, a face image with an accessory, and a face image with a large deviation angle. According to the template image distinguishing, the technical solution of this application can implement not only conventional facial recognition (face-dominant image) but also facial recognition of a user in the foregoing cases in which a face is blocked, an accessory is worn, and a deviation angle is large, without requiring the user to remove the accessory or an obstruction. In this way, facial recognition can be fast implemented.

With reference to a possible implementation of the first aspect, the template image and the first image may be compared by using a recognition model such as Arcface and/or Facenet. The recognition model performs determining by obtaining feature parameters of the template image and the first image, for example, may determine, by using a cosine distance or a Euclidean distance between the feature parameters, whether the template image matches the first image.

With reference to a possible implementation of the first aspect, for a template image, a life value of the template image dynamically changes. On one hand, the life value of the template image decreases as existence time of the template image increases. On the other hand, if the template image successfully matches a first image, the life value of the template image increases. This process includes two meanings: First, the life value of the template image decreases/degrades as time elapses. Second, if the template image successfully matches the first image, the life value of the template image is "recovered" to a specific degree. By using the foregoing process, elimination and iteration rates of the template image can be well controlled.

With reference to a possible implementation of the first aspect, a degradation manner of the life value of the template image may be represented as:

$$S_v = 1 - e^{\frac{|e_g|t_0}{(s_t - s_0)\tau_A}},$$

where $S_v$, represents the life value of the template image, $t_0$ represents the existence time of the template image, $e_g$ represents a similarity variance, $s_t$ represents a similarity value, $\tau_A$ represents an age of a current face, and $s_0$ represents a similarity offset parameter. By using this model, a degradation process of the life value of the template image can be quantitatively measured.

With reference to a possible implementation of the first aspect, a recovery manner of the life value of the template image may be represented as:

$$S_v = A + \frac{1 - A}{e^{1/v}},$$

where

A is a life value that is of the template image and that is obtained when life recovery is started according to the foregoing formula, and v is a quantity of times matching with the template image succeeds. By using this model, a recovery process of the life value of the template image can be quantitatively measured.

According to a second aspect, an image processing system is provided, including: a storage apparatus configured to store a template image, where the template image has a life value, and the life value may be used to determine whether the template image is valid; a processing apparatus communicatively connected to the storage apparatus, where the processing apparatus is configured to: obtain a first image and a template image in the storage apparatus; and compare the first image with the template image, and if the template image successfully matches the first image, store the first image in a template library as a template image.

With reference to a possible implementation of the second aspect, the image processing system further includes an image shooting apparatus, and the first image is an image taken by the image shooting apparatus.

It may be understood that the system provided in the second aspect corresponds to the method provided in the first aspect. Therefore, for implementations and achieved technical effects of the second aspect, refer to the related descriptions of the implementations of the first aspect.

According to a third aspect, a computer-readable storage medium is provided. The computer-readable stores an instruction set, and the instruction set may be executed by a processor to implement the method according to any one of the first aspect or the implementations of the first aspect.

According to a fourth aspect, a device is provided. The device includes the image processing system according to the second aspect.

With reference to a possible implementation of the fourth aspect, the device may include a vehicle, a smart home appliance, a user terminal device, a monitoring device, or the like. The image processing system in this application is introduced, so that the Internet of things device can have a facial recognition function, and can fast and accurately complete facial recognition.

In various embodiments of this application, on one hand, a life value is assigned to a template image, the life value is determined by using a degradation model and a recovery model, and a template image whose life value is lower than a threshold is eliminated through polling, so that the template image is kept iteratively updated. Therefore, some template images can be deleted when the template images are no longer suitable for being used as template images due to long time or poor matching degrees, thereby saving storage space and also improving template search efficiency. In addition, in the degradation model and the recovery model in embodiments of this application, factors such as registration time, a variance, a user age, and a quantity of matching times are fully considered. Therefore, it can be ensured that a template image retained in a system has a relatively high life value and also can implement a relatively high matching degree in a relatively long time span, so that the technical solutions of this application can persistently maintain relatively high recognition/matching accuracy in a long-time use periodicity. On the other hand, the first template image (the face-dominant image) and the second template image (the special face image) are set through distinguishing and stored, and the following two cases are further distinguished for the second template image (the special face image): An accessory (for example, a hat, a scarf, a mask, or glasses) is worn, and a recognition angle deviation is relatively large. Therefore, a conventional "front face" matching case is compatible, and user identification in a case in which a user wears an accessory, or an initial pose of a user is not frontal and consequently an imaging angle in a camera relatively greatly deviates from a standard (in these two cases, recognition often cannot be performed in the conventional technology) is also implemented. In addition, the recognition process is fast. That is, once a second template image is stored, next time a user performs facial recognition, the user can be recognized without removing an accessory, for example, a mask or glasses, or changing a head angle, because the system already stores a previous second template image that is of the user and in which the user wears a mask or glasses, or the user has a relatively large angle deviation. In this way, facial recognition time can be greatly reduced, thereby improving use convenience and satisfaction of the user. Finally, the technical solutions in embodiments of this application have a low hardware requirement, good real-time performance, and low costs. In addition, the technical solutions in embodiments of this application have good generality, that is, may be applied to facial recognition in not only the automotive field but also a field such as the Internet of things, and have a wide application prospect.

BRIEF DESCRIPTION OF DRAWINGS

FIG. 3-1 is a schematic flowchart of an image processing method according to an embodiment of this application;

FIG. 3-2 is a schematic flowchart of an image processing method according to an embodiment of this application;

DESCRIPTION OF EMBODIMENTS

Embodiments of this application provide an image processing method and system, to fast and accurately perform user identification, and still implement high recognition accuracy in a case of a large use time span.

Figure 1:
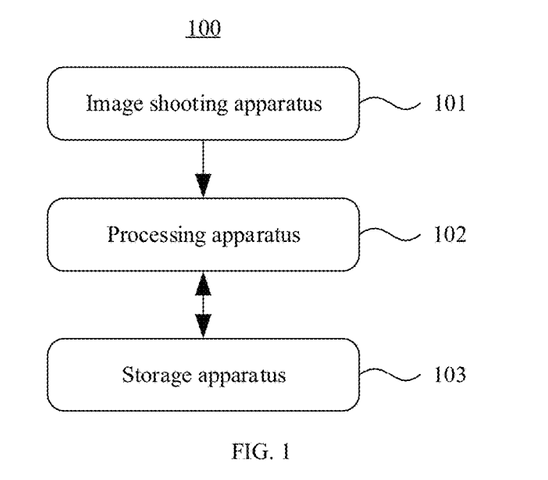
FIG. 1 is a schematic diagram of an image processing system according to an embodiment of this application.

FIG. 1 shows an image processing system 100 according to some embodiments of this application. The system 100 includes an image shooting apparatus 101, a processing apparatus 102, and a storage apparatus 103. The processing apparatus 102 includes a device or a virtual machine that has a data processing capability, for example, but not limited to, a central processing unit (CPU), a graphics processing unit (GPU), a field programmable gate array (FPGA), a system on chip (SoC:), an application-specific integrated chip (ASIC), or a combination thereof, or a virtual machine deployed on a cloud server. The image shooting apparatus 101 may be any apparatus that can obtain an image and/or a video, for example, a camera, a camera lens, or a combination thereof. The storage apparatus 103 is configured to store a template image, where the template image has a life value, and the life value may be used to determine whether the template image is valid. An image or a video of a user may be obtained by using the image shooting apparatus 101, and obtained image or video data may be sent to the processing apparatus 102, so that the processing apparatus 102 determines, based on the obtained image or video of the user and a template image obtained from the storage apparatus 103, whether user identification succeeds.

The image processing system 100 may be disposed in various scenarios/devices that require user identification, for example, a vehicle, a smart home appliance, a user terminal device, or a monitoring device. The smart home appliance may include, for example, a television, a refrigerator, a washing machine, or a sound box. The user terminal device may include, for example, a mobile phone or a notebook computer. The monitoring device may include, for example, a monitoring camera. In this application, a vehicle scenario is mainly used as an example for description.

For example, in some embodiments, the foregoing image processing system may be disposed in a vehicle. For example, the image shooting apparatus 101 and the processing apparatus 102 may be integrated into the vehicle, so that after a user enters the vehicle, an image or a video of the user can be obtained by using the image shooting apparatus 101. The storage apparatus 103 may be disposed on a vehicle end. Image or video data obtained by the image shooting apparatus 101 may be sent to the processing apparatus 102, so that the processing apparatus 102 determines, based on the obtained image or video of the user and a template image obtained from the storage apparatus 103, whether user identification succeeds.

In some other embodiments of the vehicle scenario, the image shooting apparatus 101 and the processing apparatus 102 may be integrated into a vehicle, and a near infrared camera is selected as the image shooting apparatus 101 based on a light environment in the vehicle.

In some other embodiments of the vehicle scenario, the image shooting apparatus 101 may be disposed in a vehicle. The vehicle includes a communications unit, configured to communicate with a cloud server. The processing apparatus 102 is disposed on the cloud server. The cloud server may include a physical machine and a virtual machine obtained based on physical machine virtualization. The cloud server may provide an elastic cloud computing service. The vehicle sends, by using the communications unit, an image or a video that is of a user and that is obtained by the image shooting apparatus 101 to the processing apparatus 102 located on the cloud server, so that the processing apparatus 102 determines, based on the obtained image or video of the user and an obtained template image, whether user identification succeeds.

Figure 7:
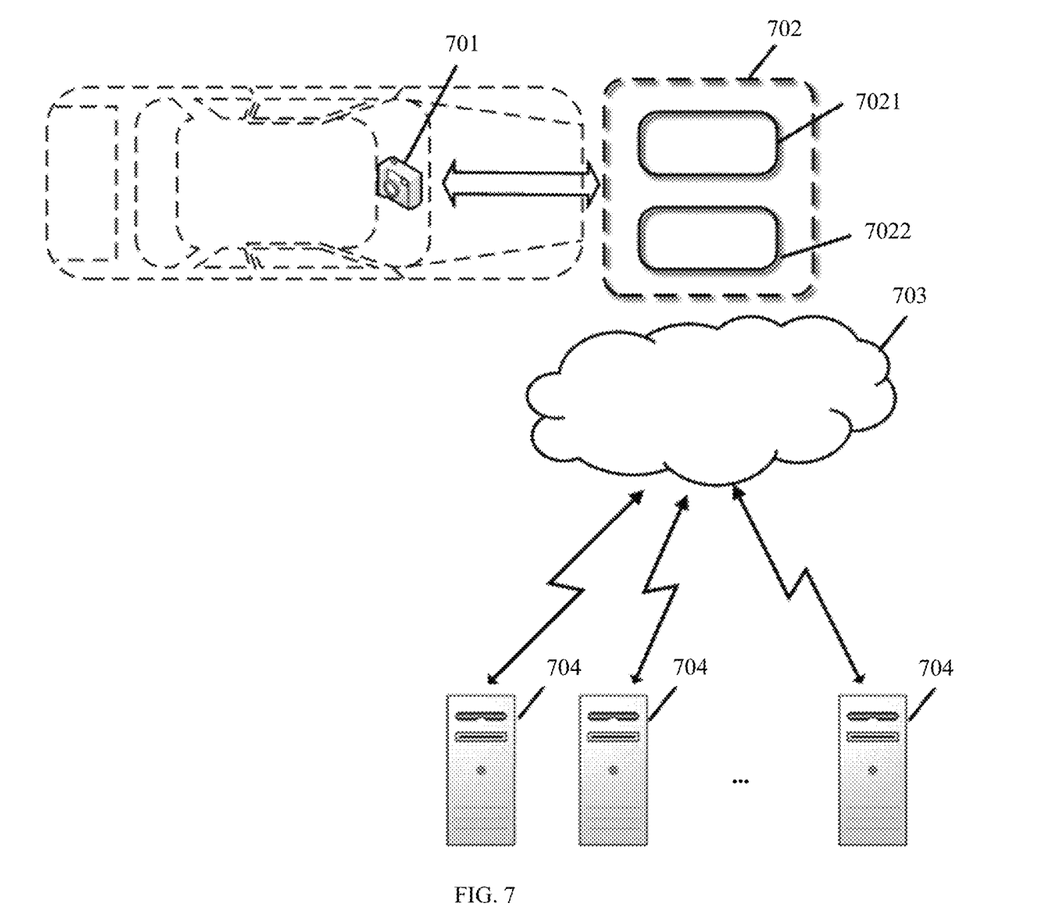
FIG. 7 is a schematic diagram of an image processing system disposed in a vehicle and a cloud server according to an embodiment of this application.

In some embodiments, referring to FIG. 7, an image shooting apparatus 701 may be disposed in a vehicle, and a storage apparatus 7021 and a processing apparatus (processor) 7022 may be disposed in a virtual machine 702 of a cloud server 703, and 704 is a physical machine at an underlying layer of the cloud server. The image shooting apparatus 701 may be communicatively connected to the storage apparatus and the processing apparatus by using a network. In this case, a template image is stored on the cloud server. In addition, a facial recognition calculation process is also completed on the cloud server, and a recognition result may be transmitted to a vehicle end by using the network. This architecture may implement a relatively large storage capacity and a relatively high computing capability, so that the technical solutions in embodiments of this application can be more fully implemented.

In some embodiments, the image processing system (including the image shooting apparatus, the storage apparatus, and the processing apparatus) in this embodiment of this application may be disposed in a mobile terminal and/or an IoT (Internet of things) device. The IoT device may include (but is not limited to) a television, a sound box, a refrigerator, or the like. The mobile terminal may include a mobile phone or the like. The image shooting apparatus may include a common optical camera, or may include a near infrared camera, to adapt to different light environments. Therefore, the mobile terminal and/or the IoT device have/has a user identification capability.

Figure 8:
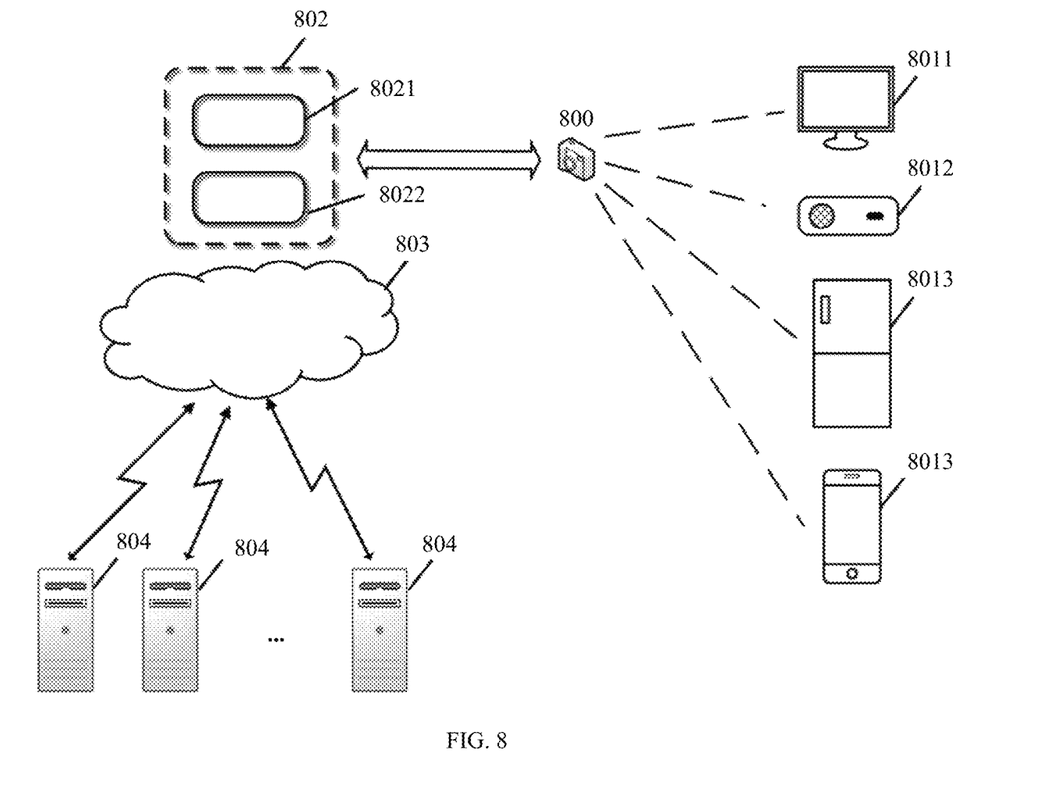
FIG. 8 is a schematic diagram of an image processing system disposed in an IoT device and a cloud server according to an embodiment of this application.

In some embodiments, only the image shooting apparatus may be disposed in a mobile terminal and/or an IoT device, and the storage apparatus and the processing apparatus may be disposed in a virtual machine on a cloud server. FIG. 8 shows an example architecture. An image shooting apparatus 800 may be disposed in a mobile terminal and/or an IoT device. The IoT device includes but is not limited to, for example, a television 8011, a sound box 8012, or a refrigerator 8013 shown in the figure. The mobile terminal may include a mobile phone 8014. A storage apparatus 8021 and a processing apparatus 8022 may be disposed in a virtual machine 802 of a cloud server 803. 804 is the cloud server. The cloud server may include a physical machine and a virtual machine obtained based on physical machine virtualization. The cloud server may provide an elastic cloud computing service. The image shooting apparatus 800 may be communicatively connected to the storage apparatus and the processing apparatus by using a network. In this case, a template image is stored on the cloud server. In addition, a facial recognition calculation process is also completed on the cloud server, and a recognition result may be transmitted to a vehicle end by using the network. This architecture may implement a relatively large storage capacity and a relatively high computing capability, so that the technical solutions in embodiments of this application can be more fully implemented.

It should be understood that the foregoing application scenarios such as the vehicle, the smart home appliance, the user terminal device, and the monitoring device are shown merely for ease of understanding of this application, and actual application of the technical solutions of this application is not limited in this aspect.

Figure 2:
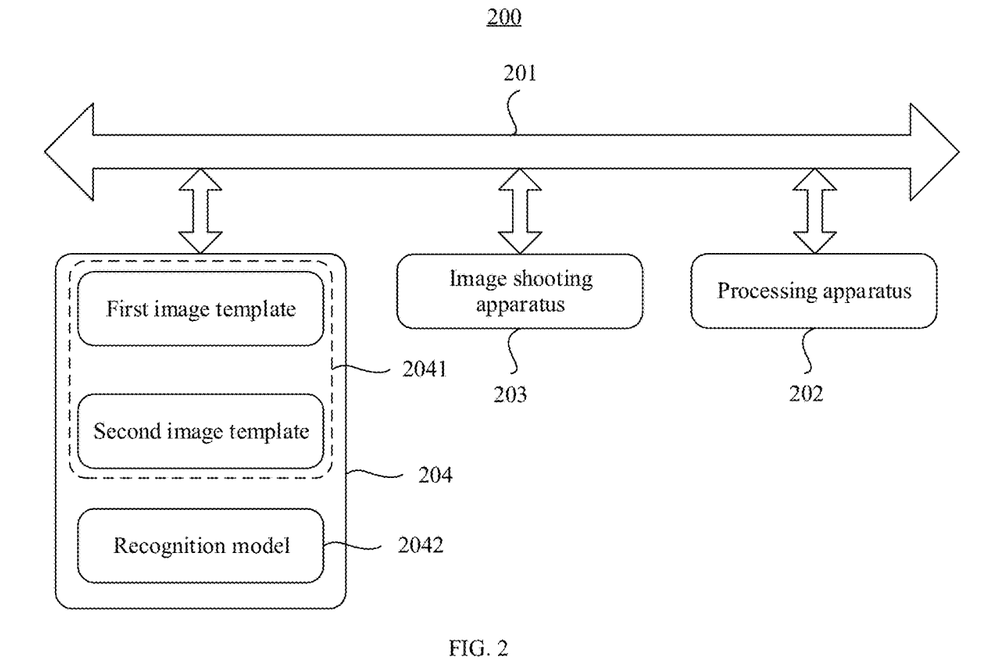
FIG. 2 is a schematic diagram of an image processing system according to an embodiment of this application.

FIG. 2 shows an image processing system 200 according to some embodiments of this application. The system 200 includes a processing apparatus 202, an image shooting apparatus 203, and a storage apparatus 204. The processing apparatus 202, the image shooting apparatus 203, and the storage apparatus 204 are communicatively connected by using a bus. It should be understood that the communicative connection herein may be a wired connection, a wireless connection, or a combination of wired and wireless connections. The processing apparatus 202 and the storage apparatus 204 may be separately disposed, or may be integrated together. The processing apparatus 202 includes a device or a virtual machine that has a data processing capability, for example, but not limited to, a central processing unit (CPU), a graphics processing unit (GPU), a field programmable gate array (FPGA), a system on chip (SoC), an application-specific integrated chip (ASIC), or a combination thereof, or a virtual machine deployed on a cloud server. The processing apparatus 202 includes a module unit that performs each function, or a necessary circuit. The image shooting apparatus 203 may be any apparatus that can obtain an image and/or a video, for example, a camera, a camera lens, or a combination thereof. The storage apparatus 204 stores a template image 2041 and a recognition model 2042. The template image 2041 includes a first template image and a second template image. The template image 2041 may be understood as an image stored as a template to determine whether image recognition succeeds. In some embodiments, in a scenario in which user facial recognition is performed, the template image 2041 is a face image stored as a template. The recognition model 2042 may be a selected model suitable for feature recognition. The recognition model 2042 may be implemented by software, hardware, firmware, or a combination of software and hardware. For example, the recognition model 2042 may be stored in the storage apparatus 204. For another example, the recognition model may be implemented by a circuit and integrated into the processing apparatus 202.

Similar to the foregoing description of the image processing system 100, the image processing system 200 may also be disposed in various scenarios/devices that require user identification, for example, a vehicle, a smart home appliance, a user terminal device, or a monitoring device.

For example, in some embodiments, the image processing system 200 may be disposed in a vehicle. For example, the image processing system may be disposed in a vehicle operating system. The storage apparatus 204 is configured to store the template image 2041 and/or the recognition model 2042. The image shooting apparatus 203 is configured to obtain image or video data of a user. The processing apparatus 202 is configured to: obtain the image or video data taken by the image shooting apparatus 203, and run the recognition model 2042 based on the obtained image or video data and the obtained template image 2041, to perform user identification.

It should be understood that the foregoing vehicle application scenario is shown merely for ease of understanding of this application, and actual application of this application is not limited in this aspect.

Based on at least the foregoing scenario, embodiments of this application provide an image processing method. In some embodiments, the method may be used to perform facial recognition. The following describes the method.

Figure 31:
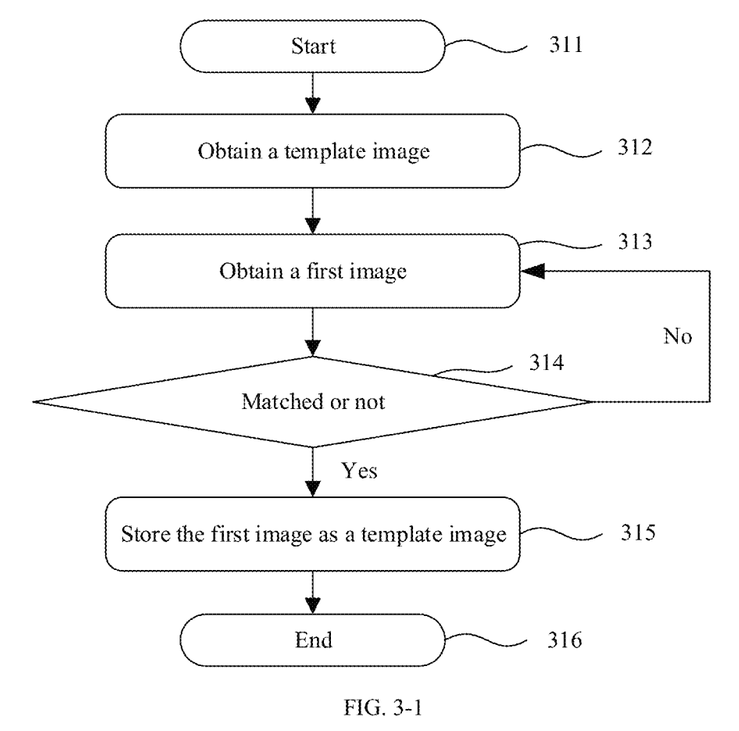

FIG. 3-1 shows an image processing method according to an embodiment of this application. The method may be performed based on the foregoing image processing system structure, for example, may be performed by the processing apparatus 202. In some embodiments, the method may include the following steps:

311: Start the image processing method. In some embodiments, the starting may be understood as preparing to perform user identification.

312: Obtain a template image. In some embodiments, before this step, the template image and a recognition model may be prepared (for example, but not limited to being, loaded to a memory of a device) for subsequent use. The image template and/or the recognition model may be stored in a device (for example, a vehicle, a user terminal, an Internet of things device, a smart home appliance, or a monitoring device), or may be obtained by a device from a cloud server.

It should be understood that any well-known suitable algorithm may be selected as the recognition model, for example, Arcface or Facenet. In addition, the algorithm may be suitably adjusted (for example, a loss function may be adjusted) to obtain an optimal effect. This is not limited in this application. The recognition model may be prestored in a to-be-applied device (for example, a vehicle, a terminal device, or an Internet of things device), or may be a model downloaded or upgraded by a user. The recognition model performs feature extraction on images, digitizes features, and compares the images.

Figure 4:
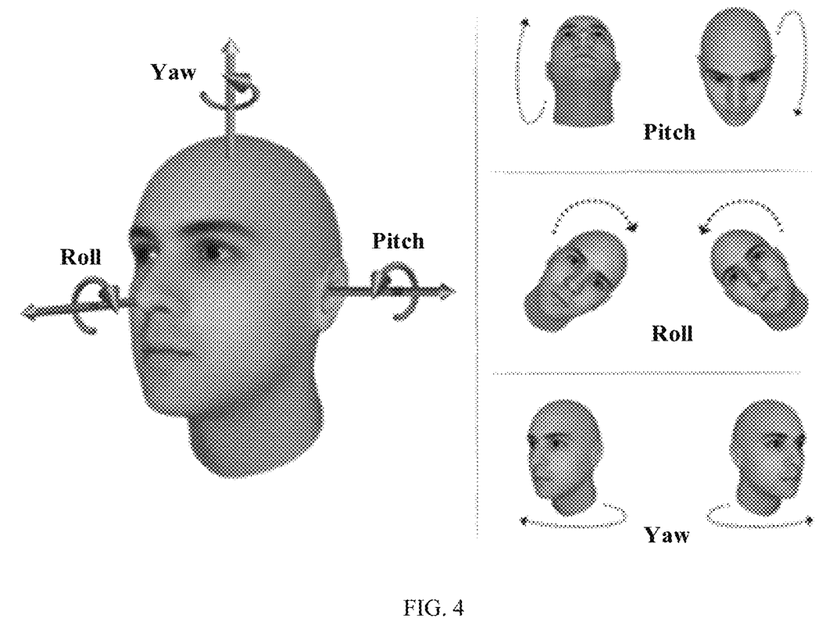
FIG. 4 is a schematic diagram of a face in a limited angle range according to an embodiment of this application.

In some embodiments, the template image includes a first template image and a second template image. The first template image includes a face-dominant image, that is, an unblocked face image of a user in a limited angle range. FIG. 4 is a schematic diagram of a head pose of a face in space. A pose (Pose) of the face in a camera is limited through rotation (yawing, pitching, and rolling) of three Cartesian coordinate axes, to obtain a face-dominant image that meets a requirement, for example, meets the following condition:

$$\text{Min}_{yaw} < Yaw < \text{Max}_{yaw}, \text{Min}_{pitch} < Pitch < \text{Max}_{pitch}, \text{ and }$$
$$\text{Min}_{roll} < Roll < \text{Max}_{roll} \qquad (1)$$

[Min$_{yaw}$, Max$_{yaw}$] indicates an angle range in which a head of the user rotates along a Z-axis, [Min$_{pitch}$, Max$_{pitch}$] indicates an angle range in which the head of the user rotates along an X-axis, and [Min$_{roll}$, Max$_{roll}$] indicates an angle range in which the head of the user rotates along a Y-axis. It may be understood that different angle ranges may be set based on requirements. Rotation angle ranges of the head of the user along Yaw, Pitch, and Roll may be, for example, (but not limited to being), set to [−10, 10], [−5, 28], and [−10, 10] (unit: degree), respectively. Only a face image that meets the ranges can be used as a face-dominant image. It should be understood that the ranges constitute no limitation, and may be adaptively modified based on a use requirement.

In addition to meeting the foregoing rotation angle condition, the face-dominant image usually requires that the face of the user should not be blocked, that is, the user should not wear a mask, an accessory, or excessively large glasses, or have excessively long hair, beard, or the like, because the behavior (blocking) often masks a face feature of the user, and consequently facial recognition cannot be implemented.

Usually, the face-dominant image may be an image obtained when a user uses various devices (for example, but not limited to, a vehicle, a terminal device, or an Internet of things device) and directly faces a camera. The face-dominant image may be stored as an initial first template image. However, in this application, the first template image is not limited to a user image obtained during registration. As device use time of the user increases, the first template image changes and iterates. In some embodiments, after the user performs facial recognition and matching succeeds, if a face image that successfully matches a template image meets the foregoing angle range limitation and unblocked-face requirement, the face image is stored as a first template image. Alternatively, in some other cases, the user may take face images and select an image considered to be suitably used as a template. After the selection, the user may upload, to a system, the template image that the user considers to be suitable. The system may determine, based on a facial recognition algorithm, whether the image uploaded by the user can be used as a first template image. Specific change and iteration rules of the first template image continue to be described in subsequent procedures.

In some embodiments, the template images may further include the second template image. In the technical solutions of this application, the following case is fully considered: Because the user wears an accessory such as glasses, a hat, or a mask, or an angle deviation of the user during facial recognition is excessively large (a possible reason for the relatively large angle deviation is that a face image in a camera is deviated from a front face due to a height or a habitual pose of the user), facial recognition is rejected, that is, the foregoing cases usually cause a facial recognition failure. However, after the user removes the accessory or adjusts an angle, and facial recognition succeeds, a face image (for example, the face image may be an image in which the user wears a mask or glasses) that cannot be recognized for an accessory wearing or angle reason is automatically stored. Such a face image is referred to as a second template image, or may be referred to as a special face image.

In the foregoing process, if the user wears an accessory such as a mask or glasses, similar to the first template image, to ensure that the second template image is a front face, the following angle limitation is imposed:

$$\text{Min}_{yaw} < Yaw < \text{Max}_{yaw}, \text{Min}_{pitch} < Pitch < \text{Max}_{pitch}, \text{ and}$$
$$\text{Min}_{roll} < Roll < \text{Max}_{roll} \quad (2)$$

[Min$_{yaw}$, Max$_{yaw}$] indicates an angle range in which a head of the user rotates along a Z-axis, [Min$_{pitch}$, Max$_{pitch}$] indicates an angle range in which the head of the user rotates along an X-axis, and [Min$_{roll}$, Max$_{roll}$] indicates an angle range in which the head of the user rotates along a Y-axis. It may be understood that different angle ranges may be set based on requirements. Rotation angle ranges of the head of the user along Yaw, Pitch, and Roll may be, for example, (but not limited to being), set to [−10, 10], [−5, 28], and [−10, 10] (unit: degree), respectively. Only a face image that meets the ranges can be used as a face-dominant image. It should be understood that the ranges constitute no limitation, and may be adaptively modified based on a use requirement.

In some embodiments, for a type with only a relatively large angle deviation, that is, the user does not wear glasses, a mask, a hat, or the like, but only an angle deviation is relatively large when facial recognition is started, the foregoing angle limitation is not required. Instead, a face image obtained at a facial recognition start moment may be directly stored as a second template image.

Figure 5:
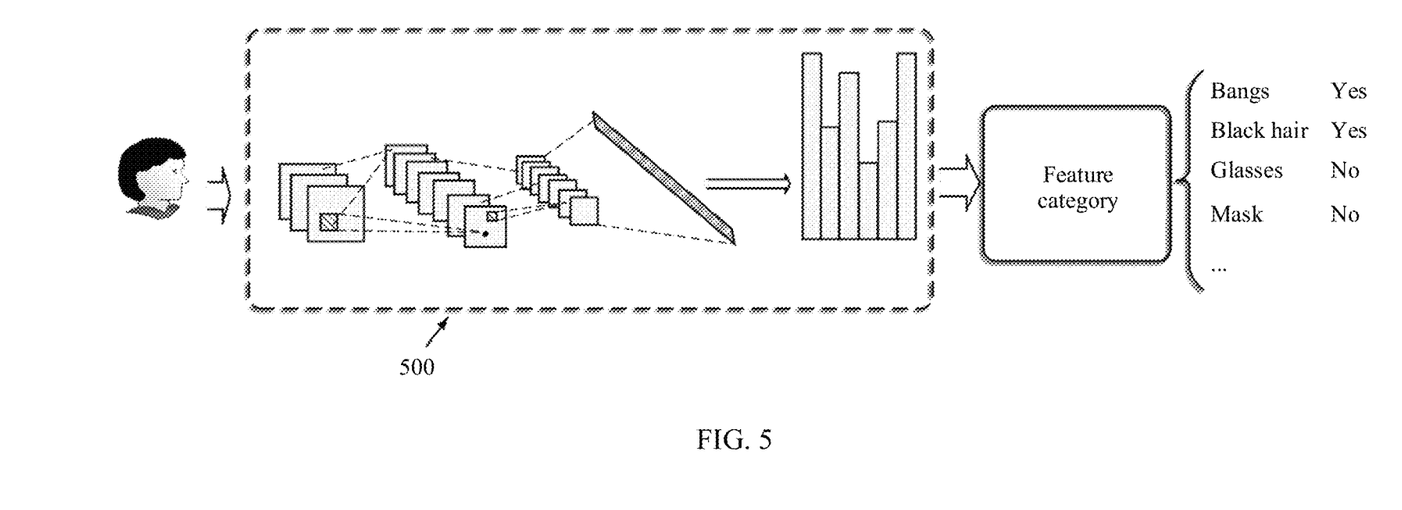
FIG. 5 is a schematic diagram of an attribute detection network according to an embodiment of this application.

In some embodiments, to ensure that the second template image is not an image in an intermediate state (for example, an intermediate process in which the user removes a mask or glasses), an attribute detection network may be used to detect and classify a face image of the user. As shown in FIG. 5, a convolutional neural network (CNN: Convolution Neural Network) may be used as an attribute detection network 500. For example, the convolutional neural network may include an input layer, a convolutional layer, a pooling layer, and a fully connected layer (an output layer). After a face image is input through the input layer, feature extraction is performed through the convolutional layer and the pooling layer, and attribute classification is performed to obtain a class of the current face image, for example, whether hair is black, whether glasses are worn or a mask is worn, whether a fringe exists, whether a mask is being removed with a hand. It may be determined, by using the classification information, whether the user is in an "initial" facial recognition state or an "intermediate" accessory removal or pose adjustment process. In addition, the attribute detection network may be further used to determine whether an image is a face-dominant image or a special face image.

Significance of the non-intermediate state detection is as follows: In these "special" cases, for example, when the user wears an accessory (for example, a mask or glasses), or a pose angle deviation of the user is relatively large, a face image that is of the user and that is obtained at a facial recognition start moment (this time is often time at which the user has just entered a vehicle) is used as a second template image. In this way, next time the user enters the vehicle in a same state, matching may be fast performed, without requiring the user to remove the accessory and then perform recognition, thereby reducing facial recognition waiting time.

It should be understood that, the attribute detection network may be suitably adjusted (for example, a layer of the convolutional neural network or a loss function may be adjusted) to obtain an optimal effect. This is not limited in this application. The attribute detection network may be set to a network that the device comes with at delivery, or may be online upgraded by the user by using a network.

In some embodiments of this application, in some scenarios, for example, if a user wears a mask at the beginning, and successfully performs facial recognition after removing the mask, a face-dominant image frame (meeting the foregoing angle range limitation) that is obtained after the mask is removed and on which facial recognition succeeds is stored as a first template image, and a special face image (meeting the foregoing angle range limitation) obtained when the user wears the mask at the beginning is stored as a second template image.

In some embodiments of this application, in some scenarios, for example, if a user has a relatively large angle deviation (does not meet a "front face" requirement) when facial recognition is started, and successfully performs facial recognition after pose adjustment, a face-dominant image frame (meeting the foregoing angle range limitation) that is obtained after the pose adjustment and on which facial recognition succeeds is stored as a first template image, an image frame that is obtained at the beginning of recognition and that has the relatively large angle deviation is stored as a second template image.

313: Obtain a first image. In some embodiments, the first image may be prestored in the device, or the first image may be obtained by using an image shooting apparatus. The image shooting apparatus may be any apparatus that can obtain an image and/or a video, for example, a camera, a camera lens, or a combination thereof. In some other embodiments, the image shooting apparatus may be a near infrared camera. When the user starts facial recognition, the image shooting apparatus obtains an image or a video stream of a face of the user, and then performs face detection on the obtained image or video stream by using a face detection algorithm, to obtain a face image, and uses the obtained face image as the first image. It should be understood that a suitable face detection algorithm may be selected based on a requirement (for example, the face detection algorithm includes but is not limited to SSD or YOLO), to obtain the face image from the image or video stream.

In some embodiments, the obtained face image is preprocessed. The preprocessing is performing size adjustment processing and standardization processing on the face image. The size adjustment processing is adjusting a size of the image in an original-scale scaling manner. The standardization processing is standardizing data by using a mean (mean) and a standard deviation (standard deviation) of original data. Processed data meets standard normal distribution, that is, a mean is 0, and a standard deviation is 1. A standardization function is:

$$x=(x-\mu)/\sigma, \text{ where}$$

$\mu$ is a mean of sample data, and $\sigma$ is a standard deviation of the sample data.

The size adjustment processing and/or the standardization processing are/is performed, so that subsequent facial recognition/matching can be more easily performed on the first image.

314: Determine whether facial recognition succeeds, that is, determine, by using the recognition model, whether the template image (including, for example, the first template image and/or the second template image) matches the obtained first image. In some embodiments, whether facial recognition succeeds is determined by determining, through calculation, whether similarity between a to-be-detected face image and a template image (including, for example, a first template image and a second template image) reaches a specified threshold. In some embodiments, determining is performed through feature parameter similarity comparison. For example, the feature determining is performed by using a cosine distance, and a cosine distance determining manner may be represented as follows:

$$\cos\theta = \frac{\sum_1^n (A_i * B_i)}{\sqrt{\sum_1^n A_i^2} * \sqrt{\sum_1^n B_i^2}},$$

where

A and B respectively represent face feature values/feature parameters of a template image and a face image obtained from a video stream, and n represents a quantity of feature dimensions.

A person skilled in the art may understand that, in addition to determining similarity between two images by using the cosine distance, similarity between two images may be measured in another habitual determining manner, for example, by using a Euclidean distance (a distance between two points in n-dimensional vector space). For another example, determining may be performed with reference to the cosine distance and the Euclidean distance.

If a determining result of step 314 is no, it indicates that facial recognition on the currently obtained first image does not succeed. In this case, the method continues to return to step 313, that is, a new next first image continues to be obtained for comparison. It should be understood that, considering security, if facial recognition fails in a specified range of a quantity of continuous times (for example, for five consecutive times), the device may be locked for a period of time or require another verification method.

If a determining result of step 314 is yes, step 315 is entered.

It should be noted that if the obtained first image is an image of a "front face" and an angle meets the foregoing angle limitation condition (1) or (2), if matching on the obtained first image can succeed, the obtained first image should successfully match the first template image, namely, the face-dominant image, in the template image.

If the user wears an accessory (for example, a scarf, a hat, a mask, or glasses) or the user has a relatively large angle deviation in the obtained first image, in this case, if matching on the obtained first image can succeed, the first image successfully matches the second template image (the special face image) in the template image. It indicates that before this time of recognition, a face image in which the user wears an accessory or has a relatively large angle deviation is stored as a second template image. Therefore, in this case, the user can directly successfully complete user identification when the user wears the accessory or has the relatively large angle deviation. However, in this case, if matching on the first image does not succeed, as described in the foregoing step 314, after user identification on the user succeeds after the user removes the accessory or frontally poses, an image that is of the user and that is obtained at the beginning is stored as a second template image, to facilitate user identification in a subsequent process.

315: If facial recognition on the first image succeeds, store the first image as a template image. In some embodiments, if the first image belongs to a face-dominant image, the first image is stored as a first template image; or if the first image belongs to a special face image, the first image is stored as a second template image.

316: Determine a life value of the stored template image after the first image is stored as the template image, to perform template image updating and iteration.

In some embodiments, when an image is created/stored as a template image, counting of registration time of the image starts from a moment at which the image is created/stored. The life value of the template image is partially controlled by using a degradation model. The degradation model is used to represent a degradation process of the life value of the template image.

In some embodiments, the degradation model is defined by using the following formula:

$$S_v = 1 - e^{\frac{|e_g|t_0}{(s_t-s_0)\tau_A}}$$

In the degradation model, $S_v$, represents the life value of the face image. Usually, a maximum value of the life value may be set to 1, and a minimum value of the life value may be set to 0. The following describes meanings of the parameters in detail:

$t_0$ represents existence time of the template image, for example, time from a moment at which the template image is created/stored to a current moment. It should be understood that counting of registration time may be selected to start from time at which the template image is created (time at which the image frame is obtained from the image shooting apparatus), time at which the template image is stored (time at which the image is stored as the template image), or a fixed time point (for example, but not limited to, 5:00 pm every day/Saturday). This does not affect the technical solutions of this application. Longer $t_0$ indicates longer existence time of the template image. It can be learned that $S_v$, decreases as the registration time to increases. It indicates that for the template image, when other impact factors are not considered, longer existence time of the template image indicates a larger replacement possibility. It usually indicates that the life value of the template image decreases as time increases. That is, if a face image exists for long time, it is possible that the face image cannot accurately correspond to/match a current user appearance (a user appearance may change as time elapses).

$e_g$ represents a face similarity variance obtained during facial recognition. It can be earned that a larger variance indicates a lower life value. For a template image, similarity is generated during facial recognition/matching, and after a plurality of times of matching, a generated similarity number sequence has a variance. A mathematical meaning of the variance is a deviation degree between a variable and a mean. In some embodiments, in the technical solutions of this application, the variance $e_g$ determines consistency at which the template image is used as a template. An ideal case is as follows: In various conditions, variances $e_g$ tend to 0, that is, the template image can provide a consistent result for facial recognition/matching in different conditions. On the contrary, if inconsistency or a larger difference exists between similarity generated during all times of facial recognition/matching of a template image, a variance $e_g$ is larger accordingly. Therefore, for a template image, when other impact factors are not considered, a smaller variance indicates a higher life value, and a larger variance indicates a lower life value.

$s_t$ represents a similarity value. A smaller similarity value indicates a lower success degree of matching with the template image, and therefore indicates a lower life value of the template image. On the contrary, higher similarity indicates a higher success degree of matching with the current template image, and therefore indicates a higher life value of the template image. Therefore, for a template image, when other impact factors are not considered, higher $s_t$ indicates a higher life value, and lower $s_t$ indicates a lower life value. $s_0$ represents a similarity offset parameter, and is a constant that can be selected based on an actual case.

$\tau_A$ represents an age that is of the user and that is recognized based on the template image. For the template image, when other impact factors are not considered, higher $\tau_A$ indicates a higher life value, and lower $\tau_A$ indicates a lower life value.

In some embodiments, in addition to the degradation model, a recovery model is also considered. The life value of the template image is partially controlled by using the recovery model. The recovery model is used to represent a recovery process of the life value of the template image.

When matching with a template image succeeds, the template image enters the recovery model, and the recovery model may be represented as follows:

$$S_v = A + \frac{1-A}{e^{1/v}},$$

where $S_v$, represents the life value of the face image, A represents a life value that is of the template image and that is obtained when the template image enters the recovery model, and v represents a quantity of times matching with the template image has succeeded so far. It can be learned that more times matching with a template image succeeds indicates faster recovery of a life value of the template image. It indicates that if matching with a template image more frequently succeeds, it is more possible that next time of matching with the template image succeeds.

A person skilled in the art should understand that a suitable function representation other than the recovery model may be alternatively used to describe the recovery process, and the recovery process is not limited to only the foregoing representation.

Figure 6:
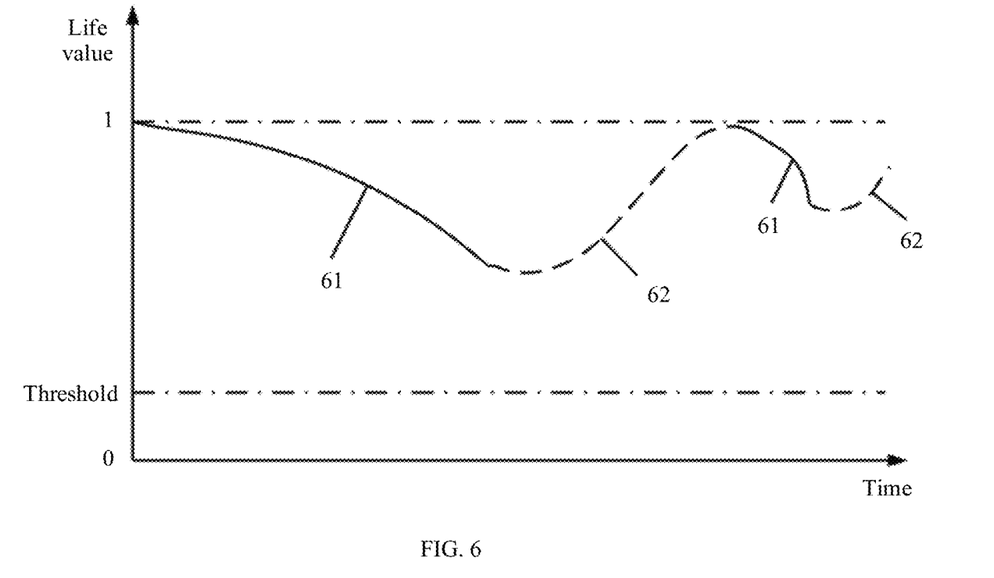
FIG. 6 is a schematic diagram of degradation and recovery of a life value of a template image according to an embodiment of this application.

FIG. 6 is a schematic diagram of a change of a life value of a template image with time. An upper dash-dotted line indicates a maximum life value (1), and a lower dash-dotted line indicates a threshold (the threshold may be, for example, but not limited to being, set to 0.2). A solid line part 61 represents a degradation process of the life value of the template image, and the life value decreases in this process. A dashed line part 62 represents a recovery process of the life value of the template image, and the life value increases in this process. FIG. 6 shows two degradation processes and two recovery processes. It may be understood that, in practice, for a given template image, there may be a plurality of degradation and/or recovery processes, or there may be only a degradation process without a recovery process.

In some embodiments, after each time a new template image is stored, life value calculation and updating may be performed on each stored template image by using the foregoing degradation model and recovery model, to obtain a life value of each template image.

Figure 32:
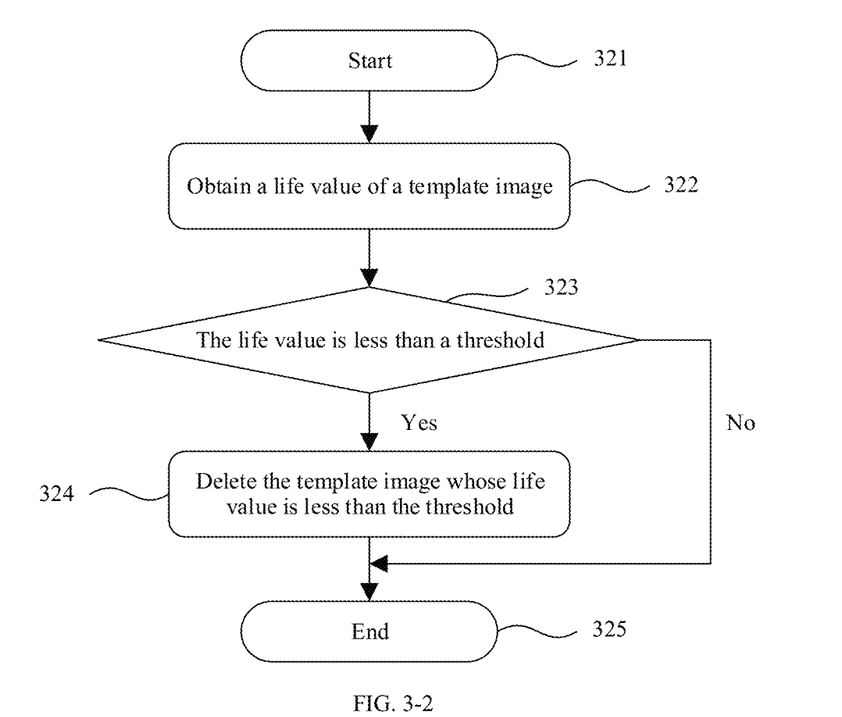

FIG. 3-2 shows a procedure of calculating and updating a life value of a template image. The life value of the template image may be calculated and updated by the processing apparatus 202.

321: Start, for example, automatically start an updating procedure, or start an updating procedure after a user instruction is received.

322: Obtain a life value of a template image.

323: Determine a life value of each template image based on a specified threshold. If life values of all template images are higher than the specified threshold, it indicates that all the template images are qualified and can be retained, and an entire procedure directly proceeds to step 325 for ending. It should be understood that the threshold may be set based on a specific use requirement. For example, the threshold may be set to 0.1, 0.2, or another suitable value. This is not limited in this application.

If it is determined that there is a template image whose life value $S_v$ is lower than the specified threshold, it indicates that the template image is no longer suitable for being used as a template image, and step 324 is entered.

324: In this step, update all the template images. For example, the template image whose life value is lower than the specified threshold may be deleted, or the template image whose life value is lower than the specified threshold may be removed from a template library and stored at another location. Then, step 325 is entered for ending.

It should be noted that, although the entire recognition procedure is performed by using the face image as an example in the foregoing procedure, this application is not limited to facial recognition. Actually, the technical solutions of this application may be used to recognize any suitable image that can be used as a recognized object.

In some embodiments, the technical solutions of this application may be used together with another user identity verification solution to improve security. For example, in addition to the image recognition (facial recognition) technical solution of this application, user identity verification may be performed in a biometric recognition manner such as speech recognition, fingerprint recognition, or iris recognition.

In various embodiments of this application, on one hand, a life value is assigned to a template image, the life value is determined by using a degradation model and a recovery model, and a template image whose life value is lower than a threshold is eliminated through polling, so that the template image is kept iteratively updated. Therefore, some template images can be deleted when the template images are no longer suitable for being used as template images due to long time or poor matching degrees. In addition, in the degradation model and the recovery model in embodiments of this application, factors such as registration time, a variance, a user age, and a quantity of matching times are fully considered. Therefore, it can be ensured that a template image retained in a system has a relatively high life value and also can implement a relatively high matching degree in a relatively long time span, so that the technical solutions of this application can persistently maintain relatively high recognition/matching accuracy in a long-time use periodicity. On the other hand, the first template image (the face-dominant image) and the second template image (the special face image) are set through distinguishing and stored, and the following two cases are further distinguished for the second template image (the special face image): An accessory (for example, a hat, a scarf, a mask, or glasses) is worn, and a recognition angle deviation is relatively large. Therefore, a conventional "front face" matching case is compatible, and user identification in a case in which a user wears an accessory, or an initial pose of a user is not frontal and consequently an imaging angle in a camera relatively greatly deviates from a standard (in these two cases, recognition often cannot be performed in the conventional technology) is also implemented. In addition, the recognition process is fast. That is, once a second template image is stored, next time a user performs facial recognition, the user can be recognized without removing an accessory, for example, a mask or glasses, or changing a head angle, because the system already stores a previous second template image that is of the user and in which the user wears a mask or glasses, or the user has a relatively large angle deviation. In this way, facial recognition time can be greatly reduced, thereby improving use convenience and satisfaction of the user. Finally, the technical solutions in embodiments of this application have a low hardware requirement, good real-time performance, and low costs.

The foregoing storage apparatus may be a random access memory (random-access memory, RAM), a flash (flash), a read only memory (read only memory, ROM), an erasable programmable read only memory (erasable programmable read only memory, EPROM), an electrically erasable programmable read only memory (electrically erasable programmable read only memory, EEPROM), a register (register), a hard disk, a removable hard disk, a CD-ROM, or any other form of storage medium known to a person skilled in the art.

The foregoing processing apparatus may be, for example, a central processing unit (CPU), a general-purpose processor, a digital signal processor (DSP), an application-specific integrated circuit ASIC), a field programmable gate array (FPGA) or another programmable logic device, a transistor logic device, a hardware component, or any combination thereof. The processing apparatus may implement or execute logical blocks, modules, and circuits in various examples described with reference to content disclosed in this application. Alternatively, the processing apparatus may be a combination for implementing a computing function, for example, a combination of one or more microprocessors, or a combination of the DSP and a microprocessor.

In this specification, the claims, and the accompanying drawings of this application, terms "first", "second", "third", "fourth", and the like (if existent) are intended to distinguish between similar objects but do not necessarily indicate a specific order or sequence. It should be understood that the data used in such a way are interchangeable in suitable circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of embodiments of this application.

In addition, service units in embodiments of this application may be integrated into one processing unit, each of the units may exist alone physically, or two or more units may be integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps described in embodiments of this application. The foregoing storage medium includes various media that can store program code, such as a USB flash drive, a removable hard disk, a read-only memory (ROM), a random access memory (RAM), a magnetic disk, or an optical disc.

A person skilled in the art should be aware that in the foregoing one or more examples, services described in this application may be implemented by hardware, software, firmware, or any combination thereof. When the services are implemented by software, the services may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or a dedicated computer.

In the foregoing specific implementations, the objectives, technical solutions, and beneficial effects of this application are further described in detail. It should be understood that the foregoing descriptions are merely specific implementations of this application.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. An image processing method, comprising:
obtaining a first image;
obtaining a template image having a life value that determines whether the template image is valid, wherein the life value of the template image in a template library decreases as existence time of the template image in the template library increases, and wherein the template image comprises a first template image and a second template image, the first template image comprises a face-dominant image, and the second template image comprises a special face image;
comparing the first image with the template image; and
storing the first image in the template library as a new template image in response to determining that the first image matches the template image.

2. The method according to claim 1, further comprising:
in response to determining that the template library comprises one or more template images, deleting a template image having a life value less than a predetermined threshold from the template library.

3. The method according to claim 1, further comprising:
increasing the life value of the template image in response to determining that the first image matches the template image.

4. The method according to claim 1, wherein the face-dominant image comprises an unblocked face image in a limited angle range, and the special face image comprises at least one of the following: a face image with a blocked face, a face image with an accessory, and a face image with a large deviation angle.

5. The method according to claim 4, wherein the template image and the first image are compared by using a recognition model based on feature parameters of the template image and the first image, and wherein the recognition model is at least one of Arcface or Facenet.

6. The method according to claim 5, wherein the recognition model determines, by using a cosine distance or a Euclidean distance between the feature parameters, whether the template image matches the first image.

7. An image processing system, comprising:
a storage apparatus, configured to store a template image having a life value that determines whether the template image is valid, wherein the life value of the template image in a template library decreases as existence time of the template image in the template library increases, and wherein the template image comprises a first template image and a second template image, the first template image comprises a face-dominant image, and the second template image comprises a special face image; and
a processing apparatus, the processing apparatus comprises:
at least one processor; and
a memory coupled to the at least one processor and storing programming instructions for execution by the at least one processor to perform operations comprising:
obtaining a first image and the template image from the storage apparatus;
comparing the first image with the template image; and
storing the first image in the template library as a new template image in response to determining that the first image matches the template image.

8. The system according to claim 7, wherein the operations comprising:
obtaining at least one template image from a cloud server, wherein the storage apparatus is configured to store the at least one template image obtained from the cloud server.

9. The system according to claim 7, wherein the life value of the template image increases when the first image matches the template image.

10. The system according to claim 7, wherein the life value of the template image in the template library decreases as existence time of the template image in the template library increases.

11. The system according to claim 10, wherein the template image comprises a first template image and a second template image, the first template image comprises a face-dominant image, and the second template image comprises a special face image.

12. The system according to claim 11, wherein the face-dominant image comprises an unblocked face image in a limited angle range, and the special face image comprises at least one of the following: a face image with a blocked face, a face image with an accessory, and a face image with a large deviation angle.

13. The system according to claim 12, wherein the template image and the first image are compared by using a recognition model based on feature parameters of the template image and the first image, and wherein the recognition model is at least one of Arcface or Facenet.

14. The system according to claim 13, wherein the recognition model determines, by using a cosine distance or a Euclidean distance between the feature parameters, whether the template image matches the first image.

15. A computer program product comprising computer-executable instructions stored on a non-transitory computer-readable storage medium that, when executed by a processor, cause an apparatus to perform operations comprising:
obtaining a first image;
obtaining a template image having a life value that determines whether the template image is valid, wherein the life value of the template image in a template library decreases as existence time of the template image in the template library increases, and wherein the template image comprises a first template image and a second template image, the first template image comprises a face-dominant image, and the second template image comprises a special face image;
comparing the first image with the template image; and
storing the first image in the template library as a new template image in response to determining that the first image matches the template image.

16. The computer program product according to claim 15, further comprising:
in response to determining that the template library comprises one or more template images, deleting a template image having a life value less than a predetermined threshold from the template library.

17. The computer program product according to claim 15, further comprising:
increasing the life value of the template image in response to determining that the first image matches the template image.

18. The computer program product according to claim 15, wherein the face-dominant image comprises an unblocked face image in a limited angle range, and the special face image comprises at least one of the following: a face image with a blocked face, a face image with an accessory, and a face image with a large deviation angle.

19. The computer program product according to claim 18, wherein the template image and the first image are compared by using a recognition model based on feature parameters of the template image and the first image, and wherein the recognition model is at least one of Arcface or Facenet.

20. The computer program product according to claim 19, wherein the recognition model determines, by using a cosine distance or a Euclidean distance between the feature parameters, whether the template image matches the first image.

* * * * *